(12) United States Patent
Akiyama (10) Patent No.: US 11,187,969 B2
(45) Date of Patent: Nov. 30, 2021

(54) PROJECTOR INCLUDING A LIGHT MODULATOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 8 days.

(21) Appl. No.: 16/722,716

(22) Filed: Dec. 20, 2019

(65) Prior Publication Data

US 2020/0201155 A1      Jun. 25, 2020

(30) Foreign Application Priority Data

Dec. 21, 2018 (JP) .............................. JP2018-240277

(51) Int. Cl.
G03B 21/20      (2006.01)
G02B 3/00       (2006.01)
H04N 9/31       (2006.01)

(52) U.S. Cl.
CPC ......... *G03B 21/204* (2013.01); *G02B 3/0037* (2013.01); *H04N 9/3108* (2013.01)

(58) Field of Classification Search
CPC .. G03B 21/005; G03B 21/006; G03B 21/008; G03B 21/28; G03B 21/204; G03B 21/208; G03B 21/2013; G03B 21/2033; G03B 21/2053; G03B 21/2066; H04N 9/045; H04N 9/315; H04N 9/317; H04N 9/3102; H04N 9/3105; H04N 9/3108; H04N 9/3114; H04N 9/3152; H04N 9/3155; H04N 9/3161; H04N 9/3164; H04N 9/3173; G02B 3/00; G02B 3/005; G02B 3/0037; G02B 3/0056; G02B 3/0062; G02B 3/06

See application file for complete search history.

(56) References Cited

U.S. PATENT DOCUMENTS

| | | | |
|---|---|---|---|
| 5,161,042 A | 11/1992 | Hamada | |
| 2005/0248736 A1* | 11/2005 | Itoh ..................... | G03B 21/006 353/102 |
| 2010/0080000 A1* | 4/2010 | Inoue ................... | H04N 9/3111 362/259 |

(Continued)

FOREIGN PATENT DOCUMENTS

JP      H04-60538 A      2/1992

*Primary Examiner* — Sultan Chowdhury
(74) *Attorney, Agent, or Firm* — Dority & Manning, P.A.

(57) ABSTRACT

A present disclosure relates to a projector including a light source, an excitation light source, a wavelength converter, a collimator system that parallelizes fluorescence outputted from the wavelength converter, a light separator that separates the fluorescence into second light and third light, a correction lens provided in an optical path of the second or third light, a superimposing lens, a light modulator having a plurality of pixels each including first, second, and third sub-pixels, a microlens array including a plurality of microlenses corresponding to the plurality of pixels, and a projection optical apparatus. First light is incident on a first position on the superimposing lens, the second light is incident on a second position on the superimposing lens, and the third light is incident on a third position on the superimposing lens.

8 Claims, 8 Drawing Sheets

(56) References Cited

U.S. PATENT DOCUMENTS

| | | | |
|---|---|---|---|
| 2012/0051044 A1* | 3/2012 | Akiyama | G03B 21/2013 |
| | | | 362/233 |
| 2014/0111775 A1* | 4/2014 | Nishikawa | G03B 21/2066 |
| | | | 353/31 |
| 2016/0011497 A1* | 1/2016 | Akiyama | G03B 21/204 |
| | | | 353/31 |
| 2018/0196335 A1* | 7/2018 | Kato | H04N 9/3182 |

* cited by examiner

PROJECTOR INCLUDING A LIGHT MODULATOR

The present application is based on, and claims priority from JP Application Serial Number 2018-240277, filed Dec. 21, 2018, the disclosure of which is hereby incorporated by reference herein in its entirety.

BACKGROUND

1. Technical Field

The present disclosure relates to a projector.

2. Related Art

There is a projector of related art that uses three dichroic mirrors disposed at different angles to separate white light from a light source into RGB light fluxes and causes the separated RGB light fluxes to be incident on one light modulator for image light generation (see JP-A-04-60538, for example).

However, the projector described above, in which the RGB light fluxes separated by the dichroic mirrors have optical path lengths different from one another, has a problem of a decrease in light use efficiency because the sizes of the areas illuminated with the color light fluxes differ from one another.

SUMMARY

According to a first aspect of the present disclosure, there is provided a projector including a light source that outputs first light, an excitation light source that outputs excitation light, a wavelength converter that converts the excitation light outputted from the excitation light source into fluorescence, a collimator system that parallelizes the fluorescence outputted from the wavelength converter, a light separator that separates the fluorescence into second light and third light having colors different from each other, a correction lens provided in an optical path of the second light or the third light, a superimposing lens provided on a downstream of the correction lens, a light modulator having a plurality of pixels each including a first sub-pixel, a second sub-pixel, and a third sub-pixel, a microlens array including a plurality of microlenses corresponding in a one-to-one relationship to the plurality of pixels, and a projection optical apparatus that projects light outputted from the light modulator. The first light, the second light, and the third light are incident on different positions on the superimposing lens and therefore incident on the microlenses in different directions. The first light passes through the microlenses and is incident on the first sub-pixels. The second light passes through the microlenses and is incident on the second sub-pixels. The third light passes through the microlenses and is incident on the third sub-pixels.

In the first aspect described above, the correction lens may be a convex lens disposed in the optical path of the second light.

In the first aspect described above, the correction lens may be a concave lens disposed in the optical path of the third light.

In the first aspect described above, the first light may be blue light, the second light may be red light, the third light may be green light, and the projector may further include a light separating mirror group that separates the third light into first green light and second green light.

In the first aspect described above, the pixels may each further include a fourth sub-pixel, the first green light may pass through the microlenses and may be incident on the third sub-pixels, and the second green light may pass through the microlenses and may be incident on the fourth sub-pixels.

DESCRIPTION OF EXEMPLARY EMBODIMENTS

Embodiments of the present disclosure will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

A projector according to the present embodiment is a projection-type image display apparatus that displays a color image on a screen. The projector according to the present embodiment uses a laser light source that produces high-luminance, high-power light, such as a semiconductor laser, as a light source of an illuminator.

Figure 1:
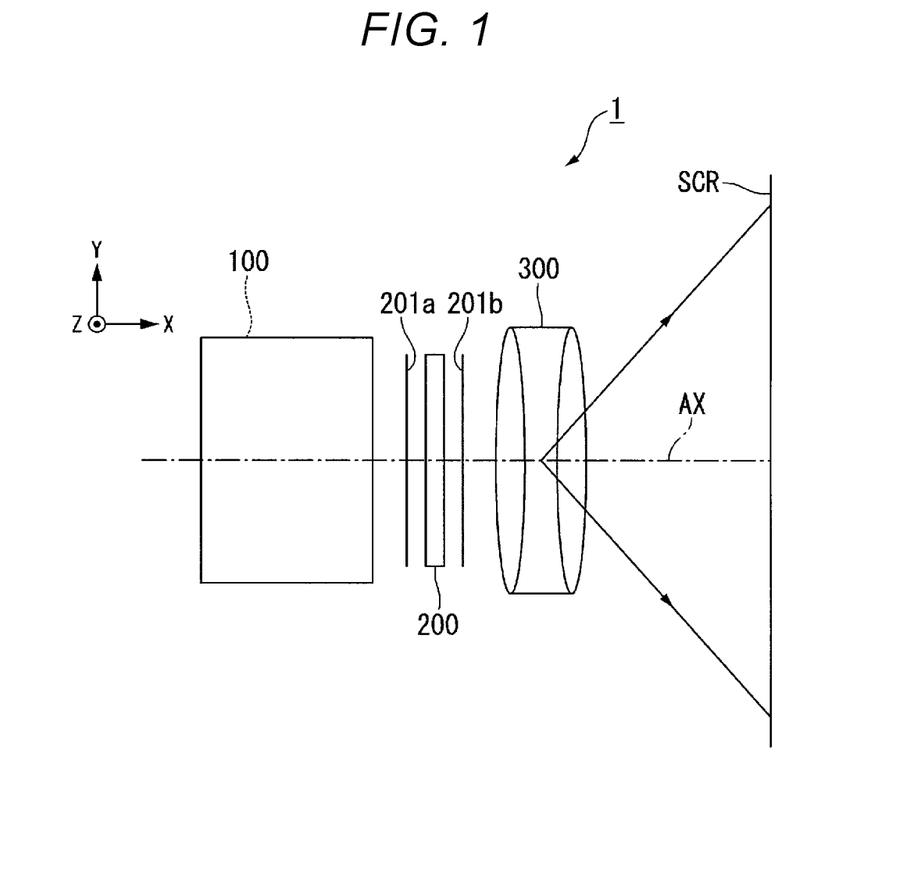
FIG. 1 is a plan view showing a schematic configuration of a projector according to a first embodiment.

FIG. 1 is a plan view showing a schematic configuration of the projector according to the present embodiment.

A projector 1 includes an illuminator 100, a light modulator 200, and a projection optical apparatus 300, as shown in FIG. 1. In the projector 1, an illumination optical axis of illumination light outputted from the illuminator 100 is called an optical axis AX. An XYZ orthogonal coordinate system is used in the following description as required. The direction Z corresponds to the upward/downward direction of the projector, the direction X corresponds to the direction parallel to the optical axis AX, and the direction Y corresponds to the direction perpendicular to the directions X and Z.

The light modulator 200 is, for example, a single-panel liquid crystal light modulator using one color liquid crystal display panel. Employing such a single-panel liquid crystal light modulator allows reduction in size of the projector 1. The light modulator 200 modulates the illumination light from the illuminator 100 in accordance with image information to form image light.

A light-incident-side polarizer 201a is provided at one side of the light modulator 200 that is the side facing the illuminator 100. A light-exiting-side polarizer 201b is provided at another side of the light modulator 200 that is the side facing the projection optical apparatus 300. The light-incident-side polarizer 201a and the light-exiting-side polarizer 201b have polarization axes perpendicular to each other.

The projection optical apparatus 300 enlarges the image light modulated by the light modulator 200, and projects the enlarged image light toward a screen SCR. The number of lenses that form the projection system may be one or more.
Illuminator A specific configuration of the illuminator 100 will subsequently be described.

Figure 2:
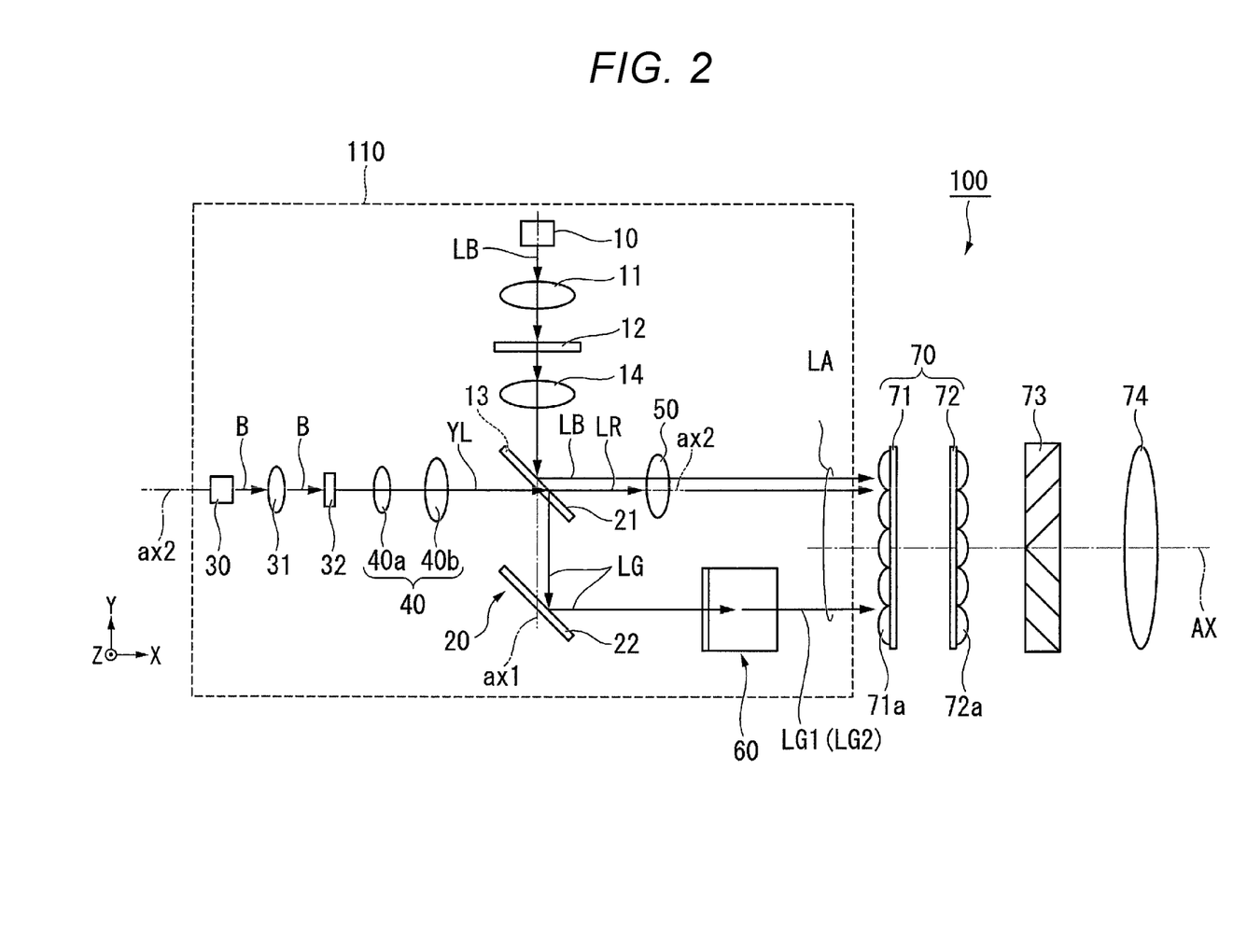
FIG. 2 is a top view of an illuminator.
Figure 3:
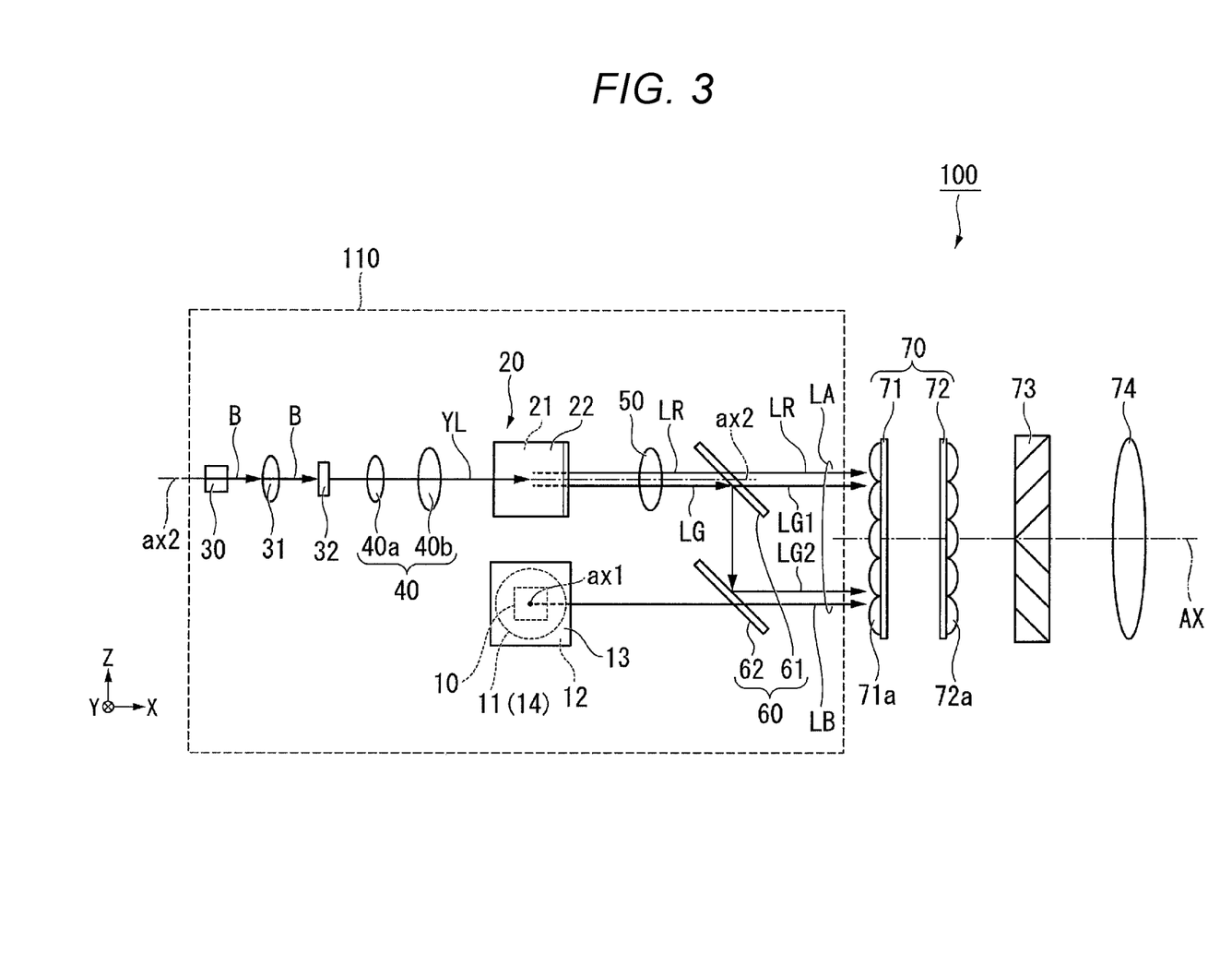
FIG. 3 is a side view of the illuminator.

FIG. 2 is a top view of the illuminator viewed from the side facing the positive side of the direction Z toward the negative side thereof. FIG. 3 is a side view of the illuminator viewed from the side facing the negative side of the direction Y toward the positive side thereof.

The illuminator 100 includes a light source unit 110, a lens integrator unit 70, a polarization converter 73, and a superimposing lens 74, as shown in FIGS. 2 and 3.

The light source unit 110 includes a light source 10, a first light collection lens 11, a diffuser 12, a mirror 13, an excitation light source 30, a second light collection lens 31, a phosphor element (wavelength converter) 32, a collimator system 40, a light separator 20, a correction lens 50, and a light separating mirror group 60.

In the light source unit 110, the light source 10, the first light collection lens 11, the diffuser 12, a collimator lens 14, and the mirror 13 are disposed in the presented order along an optical axis ax1 of the light source 10. Further, in the light source unit 110, the excitation light source 30, the second light collection lens 31, the phosphor element 32, the collimator system 40, the light separator 20, the collection lens 50, and the light separating mirror group 60 are disposed in the presented order along an optical axis ax2 of the excitation light source 30. The optical axes ax1 and ax2 are separate from each other in the direction Z, and the optical axes ax1 and ax2 are perpendicular to each other in a plan view along the direction Z. The optical axis ax2 is parallel to the optical axis AX.

In the present embodiment, the light source 10 is formed, for example, of a light emitting diode that emits a blue light flux (first light) LB. The light source 10 can be formed of a solid-state light emitter, such as a laser diode, in place of a light emitting diode. The light source 10 can instead be formed of a single solid-state light emitter or the combination of a plurality of solid-state light emitters.

The first light collection lens 11 collects the blue light flux LB outputted from the light source 10 and is formed, for example, of one convex lens. The number of lenses that form the first light collection lens 11 may be one or more.

The diffuser 12 diffuses the blue light flux LB to homogenize the illuminance distribution thereof. The diffuser 12 can be formed of a known diffuser, for example, a ground glass plate, a holographic diffuser, a transparent substrate having a blasted surface, or a transparent substrate containing dispersed scatterers that scatter light, such as beads.

The collimator lens 14 parallelizes the blue light flux LB diffused by the diffuser 12 and causes the parallelized blue light flux LB to be incident on the mirror 13. The collimator lens 14 may be formed of a plurality of lenses.

The mirror 13 reflects the blue light flux LB diffused by the diffuser 12 toward the positive side of the direction X along the optical axis ax2. The mirror 13 is so disposed as to incline by 45 degrees with respect to the optical axis ax1.

The mirror 13 is so disposed as to overlap with a dichroic mirror 21 in the light separator 20, which will be described later, in the plan view.

The excitation light source 30 excites the phosphor element 32 to cause it to produce fluorescence. The excitation light source 30 is formed of a blue laser light emitter that emits blue laser light that belongs to a wavelength band ranging from 440 to 470 nm as excitation light B. The excitation light source 30 may instead be formed of a plurality of blue laser light emitters in accordance with required power of the excitation light B.

The second light collection lens 31 collects the excitation light B outputted from the excitation light source 30 and is formed, for example, of one convex lens. The number of lenses that form the second light collection lens 31 may be one or more.

The phosphor element 32 contains a phosphor that absorbs the excitation light B and is excited therewith. The phosphor excited with the excitation light B emits fluorescence (yellow fluorescence) YL that belongs to a wavelength band ranging, for example, from 500 to 700 nm. The phosphor element 32 emits the fluorescence YL via the side opposite the side on which the excitation light B is incident. The fluorescence YL emitted from the phosphor element 32 enters the collimator system 40. The illuminator 100 in the present embodiment, which produces white light by using the fluorescence YL produced by exciting the phosphor element 32, can achieve high light emission efficiency.

The collimator system 40 picks up and parallelizes the fluorescence YL emitted from the phosphor element 32. The collimator system 40 therefore needs to have a large numerical aperture (NA). The collimator system 40 in the present embodiment is formed, for example, of a first convex lens 40a and a second convex lens 40b. The fluorescence YL parallelized by the collimator system 40 enters the light separator 20.

The light separator 20 separates the fluorescence YL into two light fluxes having colors different from each other. Specifically, the light separator 20 is formed of the dichroic mirror 21 and a mirror 22. The dichroic mirror 21 separates the yellow fluorescence YL from the phosphor element 32 into a red light flux (second light) LR and a green light flux (third light) LG. The dichroic mirror 21 separates the fluorescence YL into the two light fluxes by transmitting the red light flux LR and reflecting the green light flux LG.

The mirror 22 is disposed in the optical path of the green light flux LG and reflects the green light flux LG reflected off the dichroic mirror 21 toward the positive side of the direction X. The red light flux LR and the green light flux LG separated by the light separator 20 both travel toward the positive side of the direction X.

The illuminator 100 in the present embodiment, which produces white light by using the fluorescence YL produced from the excited phosphor element 32, can achieve high light emission efficiency. However, the illuminator 100 in the present embodiment, in which the collimator system 40 is formed only of the convex lenses as described above, produces chromatic aberrations. That is, the focal point of the collimator system 40 changes whenever the color of the light that enters the collimator system 40 changes.

Specifically, the surface of the phosphor element 32 is located at the point where the green light flux LG is brought into focus by the collimator system 40 in the present embodiment. That is, the green light flux LG out of the fluorescence YL exits from the focal position of the collimator system 40, whereby the collimator system 40 can satisfactorily parallelize the green light flux LG.

On the other hand, since the red light flux LR out of the fluorescence YL exits from a point shifted from the focal point of the collimator system 40, the collimator system 40 cannot satisfactorily parallelize the red light flux LR. Specifically, the point where the red light flux LR is brought into focus is shifted from the point where the green light flux LG is brought into focus toward the side farther from the collimator system 40, that is, the side inward from the surface of the phosphor element 32. The red light flux LR having passed through the collimator system 40 therefore diverges.

Figure 4:
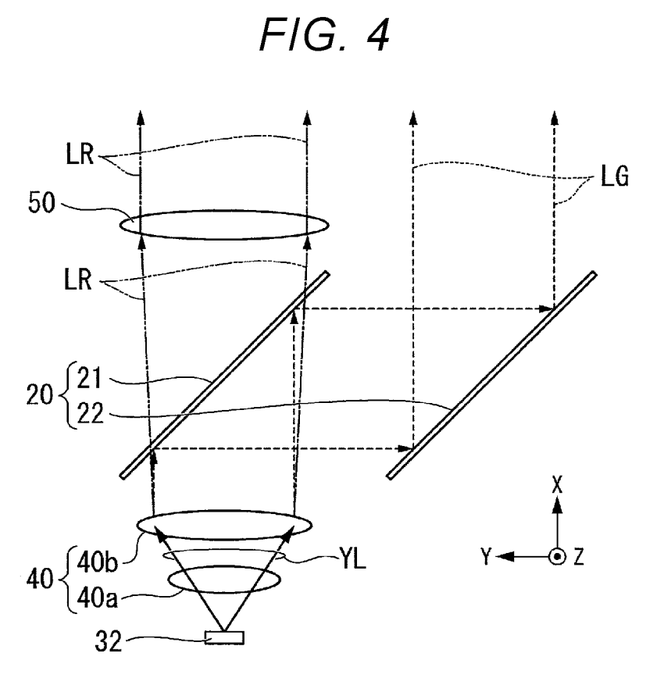
FIG. 4 describes the effect of a correction lens.

To avoid the problem, the illuminator 100 in the present embodiment is provided with the correction lens 50 in the optical path of the red light flux LR separated by the light separator 20. FIG. 4 describes the effect of the correction lens. The correction lens 50 in the present embodiment is formed of a convex lens and collects the red light flux LR, which is a divergent light flux, to cause the red light flux LR to converge so that the red light flux LR is parallelized, as shown in FIG. 4. As a result, the parallelized red light flux LR and green light flux LG travel toward the positive side of the direction X.

Referring back to FIG. 3, the light separating mirror group 60 is disposed in the optical path of the green light flux LG reflected off the mirror 22 of the light separator 20 and separates the green light flux LG into two light fluxes. Specifically, the light separating mirror group 60 is formed of a half-silvered mirror 61 and a mirror 62. The half-silvered mirror 61 transmits part of the green light flux LG as a first green light flux LG1 and reflects the remainder of the green light flux LG as a second green light flux LG2 toward the negative side of the direction Z. The first green light flux LG1 travels along the optical axis ax2 and enters the lens integrator unit 70.

The second green light flux LG2 is incident on the mirror 62. The mirror 62 reflects the second green light flux LG2 toward the positive side of the direction X. The second green light flux LG2 reflected off the mirror 62 travels along the optical axis ax2 and enters the lens integrator unit 70.

As described above, the light separating mirror group 60 separates the green light flux LG into two light fluxes, the first green light flux LG1 and the second green light flux LG2.

The light source unit 110 in the present embodiment outputs a light flux LA, which includes the blue light flux LB, the red light flux LR, the first green light flux LG1, and the second green light flux LG2, toward the lens integrator unit 70. The center axis of the light flux LA outputted from the light source unit 110 coincides with the optical axis AX. The chief rays of the light fluxes LB, LR, LG1, and LG2 are so positioned as to be separate from the center axis of the light flux LA (optical axis AX) by the same distance.

The lens integrator unit 70 includes a first lens array 71 and a second lens array 72. The first lens array 71 is formed, for example, of a plurality of first lenslets 71a arranged in a plane. The first lenslets 71a of the first lens array 71 divide the light flux LA outputted from the light source unit 110 into a plurality of thin light fluxes and collect the light fluxes.

The second lens array 72 includes a plurality of second lenslets 72a arranged in a plane in correspondence, for example, with the first lenslets 71a of the first lens array 71. In the present embodiment, the second lens array 72 along with the superimposing lens 74, which will be described later, superimposes images of the first lenslets 71a of the first lens array 71 on one another at the light modulator 200 and causes the superimposed image to be incident on the light modulator 200.

The polarization converter 73 is formed of polarization separation films and retardation films (half-wave plate) arranged in an array. The polarization converter 73 converts the polarization directions of the light fluxes from the lens integrator unit 70 into a predetermined direction. As a result, the polarization direction of the light incident on the light modulator 200 coincides with the direction of the axis of transmission of the light-incident-side polarizer 201a disposed on the light incident side of the light modulator 200. The light-incident-side polarizer 201a therefore does not block the light to be incident on the light modulator 200, whereby the light use efficiency is improved.

The superimposing lens 74 is formed, for example, of a convex lens, superimposes the light fluxes having passed through the lens integrator unit 70 and the polarization converter 73 on one another, and causes the superimposed light to be incident on the light modulator 200.

In the present embodiment, the light fluxes LB, LR, LG1, and LG2 in the light flux LA do not overlap with one another. The light fluxes LB, LR, LG1, and LG2 are therefore incident on different areas of the lens integrator unit 70. The light fluxes LB, LR, LG1, and LG2 having passed through the lens integrator unit 70 and the polarization converter 73 still do not overlap with one another and are incident on the superimposing lens 74.

In the following description, the light flux LA having passed through the lens integrator unit 70 and the polarization converter 73 is referred to as illumination light W. The illumination light W contains blue light WB, red light WR, first green light WG1, and second green light WG2. The blue light WB corresponds to the above-mentioned blue light flux LB having passed through the lens integrator unit 70 and the polarization converter 73. The red light WR corresponds to the above-mentioned red light flux LR having passed through the lens integrator unit 70 and the polarization converter 73. The first green light WG1 corresponds to the above-mentioned first green light flux LG1 having passed through the lens integrator unit 70 and the polarization converter 73. The second green light WG2 corresponds to the above-mentioned second green light flux LG2 having passed through the lens integrator unit 70 and the polarization converter 73.

Figure 5:
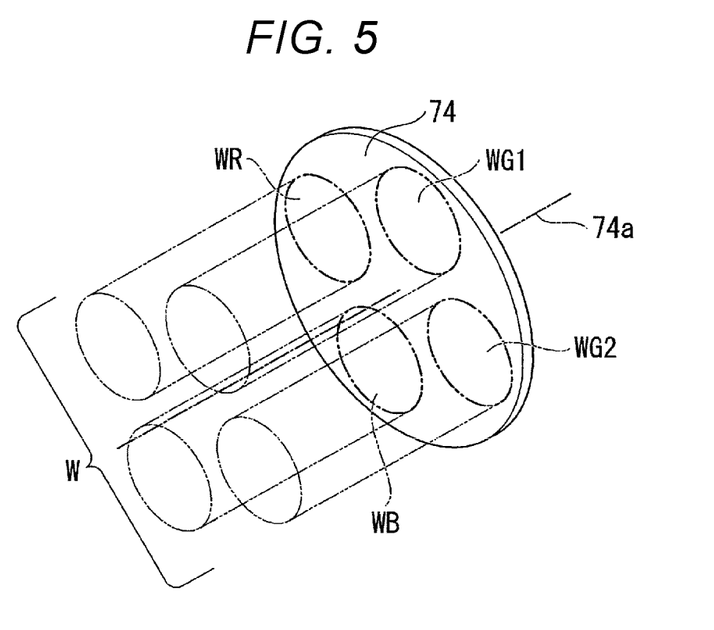
FIG. 5 is a perspective view showing the state of the light incident surface of a superimposing lens.

FIG. 5 is a perspective view showing the state of the light incident surface of the superimposing lens 74. FIG. 5 diagrammatically shows the blue light WB, the red light WR, the first green light WG1, and the second green light WG2.

The blue light WB, the red light WR, the first green light WG1, and the second green light WG2, which form the illumination light W, also do not overlap with one another. The blue light WB, the red light WR, the first green light WG1, and the second green light WG2 are therefore incident on different locations of the superimposing lens 74, as shown in FIG. 5. The chief rays of the blue light WB, the red light WR, the first green light WG1, and the second green light WG2 are separate from a lens optical axis 74a of the superimposing lens 74 by the same distance. In case where the blue light WB, the red light WR, the first green light WG1, and the second green light WG2 are not particularly distinguished from one another in the following description, they are collectively referred to as light fluxes WB, WR, WG1, and WG2 in some cases.

In the present embodiment, the superimposing lens 74 causes the light fluxes WB, WR, WG1, and WG2 to be incident on the light modulator 200 in different directions in accordance with the positions where the light fluxes WB, WR, WG1, and WG2 are incident on the superimposing lens 74. That is, the superimposing lens 74 allows the light fluxes WB, WR, WG1, and WG2 to be incident on the light modulator 200 in four directions.

Figure 6:
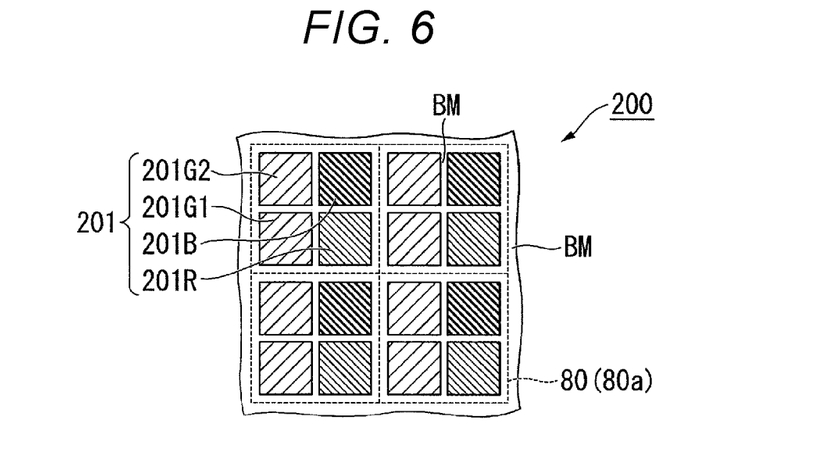
FIG. 6 is a plan view showing the pixel structure of a light modulator.

The pixel structure of the light modulator 200 will subsequently be described. FIG. 6 is a plan view showing the pixel structure of the light modulator 200, and FIGS. 7 and 8 are cross-sectional views showing key parts of the pixel structure of the light modulator 200.

Figure 7:
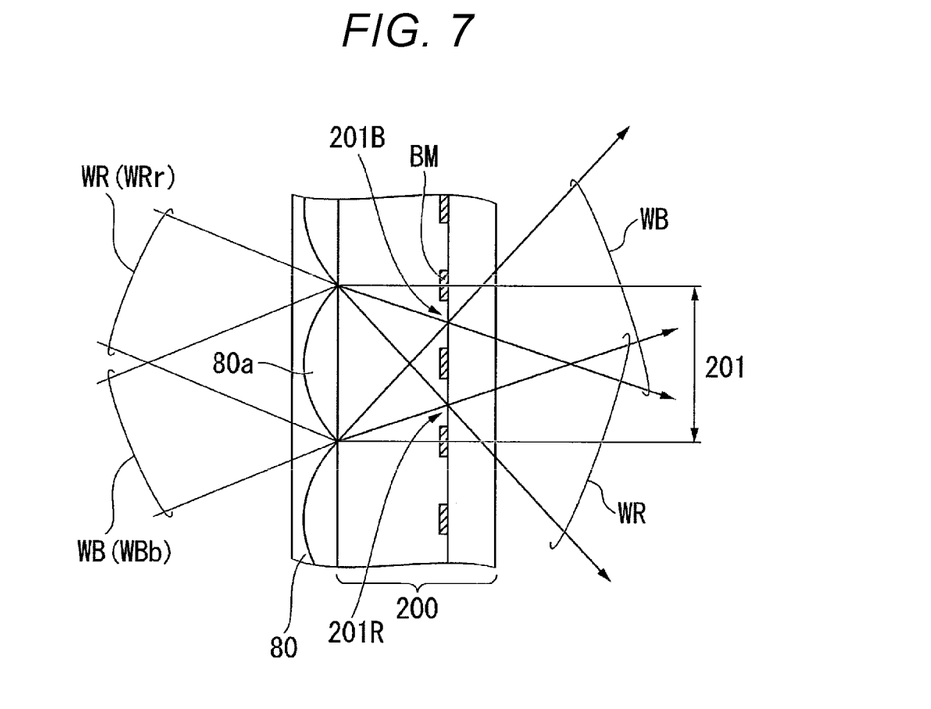
FIG. 7 shows a cross section of first and second sub-pixels.
Figure 8:
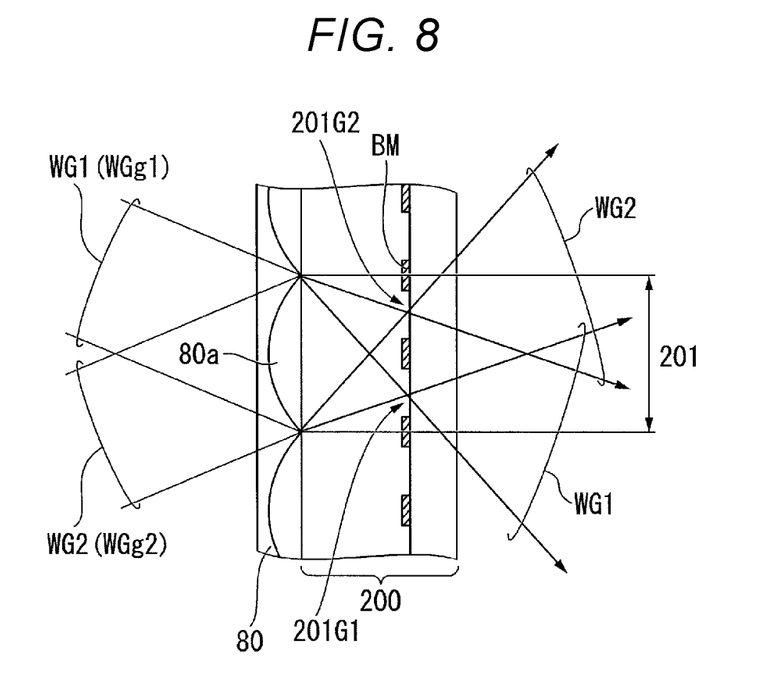
FIG. 8 shows a cross section of third and fourth sub-pixels.

The light modulator 200 has a plurality of pixels 201, as shown in FIGS. 6, 7 and 8. The pixels 201 are each formed of a first sub-pixel 201B, a second sub-pixel 201R, a third sub-pixel 201G1, and a fourth sub-pixel 201G2. The first sub-pixel 201B, the second sub-pixel 201R, the third sub-pixel 201G1, and the fourth sub-pixel 201G2 are abbreviated simply to sub-pixels 201B, 201R, 201G1, and 201G2 in some cases.

In the light modulator 200 in the present embodiment, the plurality of pixels 201 are disposed in a matrix along the directions Y and Z, as shown in FIG. 6. In each of the pixels 201, the first sub-pixel 201B and the second sub-pixel 201R are juxtaposed with each other in the presented order toward the negative side of the direction Z, the fourth sub-pixel 201G2 is juxtaposed with the first sub-pixel 201B in the positive side of the direction Y, and the third sub-pixel 201G1 is juxtaposed with the second sub-pixel 201R in the positive side of the direction Y. The subpixels 201B, 201R, 201G1, and 201G2 are separated from each other via a black matrix BM. In the present embodiment, the pixels 201 are each optically conjugate with the light exiting surface of the second lens array 72.

In the present embodiment, the subpixels 201B, 201R, 201G1, and 201G2 each have a substantially square shape, and the pixels 201 as a whole has a substantially square shape. Therefore, the pixels 201 have uniform luminance, whereby the light modulator 200 can produce image light with good quality free of unevenness.

As described above, the projector 1 according to the present embodiment, in which the light fluxes WB, WR, WG1, and WG2 are incident on different positions on the superimposing lens 74, allows the light fluxes WB, WR, WG1, and WG2 to be incident in predetermined different directions on a microlens array 80 provided at the light incident side of the light modulator 200.

The light modulator 200 in the present embodiment includes the microlens array 80 integrated with the light-incident surface of the light modulator 200, as shown in FIGS. 7 and 8. The microlens array 80 may instead be a component different from the light modulator 200. FIG. 7 shows a cross section of the first sub-pixel 201B and the second sub-pixel 201R. FIG. 8 shows a cross section of the third sub-pixel 201G1 and the fourth sub-pixel 201G2.

The microlens array 80 includes a plurality of microlenses 80a, which form a plurality of very thin light fluxes from the light incident on the microlens array 80.

Specifically, the blue light WB incident on the microlens array 80 is divided by the plurality of microlenses 80a into a plurality of very thin light fluxes WBb, as shown in FIG. 7. The red light WR incident on the microlens array 80 is divided by the plurality of microlenses 80a into a plurality of very thin light fluxes WRr.

The first green light WG1 incident on the microlens array 80 is divided by the plurality of microlenses 80a into a plurality of very thin light fluxes WGg1, as shown in FIG. 8. The second green light WG2 incident on the microlens array 80 is divided by the plurality of microlenses 80a into a plurality of very thin light fluxes WGg2.

The microlenses 80a are so disposed as to correspond in a one-to-one relationship to the pixels 201 of the light modulator 200. The blue light WB out of the illumination light W incident on the light modulator 200 corresponds to the first sub-pixels 201B. That is, the blue light WB incident on the microlens array 80 obliquely upward is divided into the very thin light fluxes WBb, which are incident on the first sub-pixels 201B.

The red light WR corresponds to the second sub-pixels 201R. That is, the red light WR incident on the microlens array 80 obliquely downward is divided into the very thin light fluxes WRr, which are incident on the second sub-pixels 201R.

The first green light WG1 corresponds to the third sub-pixels 201G1. That is, the first green light WG1 incident on the microlens array 80 obliquely downward is divided into the very thin light fluxes WGg1, which are incident on the third sub-pixels 201G1.

The second green light WG2 corresponds to the fourth sub-pixels 201G2. That is, the second green light WG2 incident on the microlens array 80 obliquely upward is divided into the very thin light fluxes WGg2, which are incident on the fourth sub-pixels 201G2.

The projector 1 according to the present embodiment does not cause the situation in which the sizes of the areas illuminated with the color light fluxes differ from one another due to differences in optical path length among the color light fluxes, unlike the case in related art where a plurality of dichroic mirrors are used to adjust the directions in which the color light fluxes are incident on the sub-pixels of the light modulator 200. Therefore, the projector 1 according to the present embodiment, in which the optical path lengths of the light fluxes WB, WR, WG1, and WG2 separated by the different light incident positions on the superimposing lens 74 do not differ from one another, does not cause the sizes of the areas illuminated with the light fluxes WB, WR, WG1, and WG2 to differ from one another. The light fluxes WB, WR, WG1, and WG2 are therefore efficiently incident on the light modulator 200, whereby a decrease in light use efficiency of the illuminator 100 can be avoided.

Further, the projector 1 according to the present embodiment, in which the fluorescence YL is used to produce white light, can achieve high light emission efficiency. On the other hand, in the projector 1 according to the present embodiment, the chromatic aberrations produced in the collimator system 40 undesirably cause the red light flux LR out of the fluorescence YL to be divergent.

If the divergent red light flux LR is directly incident on the light modulator 200, the position where the red light flux LR is collected is so shifted that the red light flux LR is also incident on the adjacent sub-pixel, resulting the red light flux LR bleeding in the image light and hence a decrease in the quality of the image light projected on the screen SCR.

To avoid the problem, the projector 1 according to the present embodiment, in which the angle of divergence of the red light flux LR is so adjusted by the correction lens 50 that the red light flux LR is parallelized, allows the red light flux LR to be incident on desired sub-pixels. Occurrence of the bleeding in the image light can therefore be suppressed, whereby the quality of the image light projected on the screen SC can be improved.

Further, the projector 1 according to the present embodiment, which includes the light separating mirror group 60, which divides the green light flux LG produced from the fluorescence YL into two light fluxes, can produce the first green light flux LG1 corresponding to the third sub-pixels 201G1 and the second green light flux LG2 corresponding to the fourth sub-pixels 201G2. Therefore, out of the pixels 201 in the present embodiment, the number of sub-pixels corresponding to green is greater than the numbers of sub-pixels corresponding to red and blue. The projector 1 according to the present embodiment therefore allows visual recognition of the image light produced by the light modulator 200 as a high-resolution image for human eyes.

Second Embodiment

The configuration of a projector according to a second embodiment will subsequently be described. The present embodiment differs from the first embodiment in terms of the position of the correction lens in the illuminator, and the other configuration is the same in the two embodiments. The following description will be primarily made of where the correction lens is disposed and the effect provided by the thus disposed correction lens. The same members and configurations as those in the first embodiment have the same reference characters and will not be described in detail.

Figure 9:
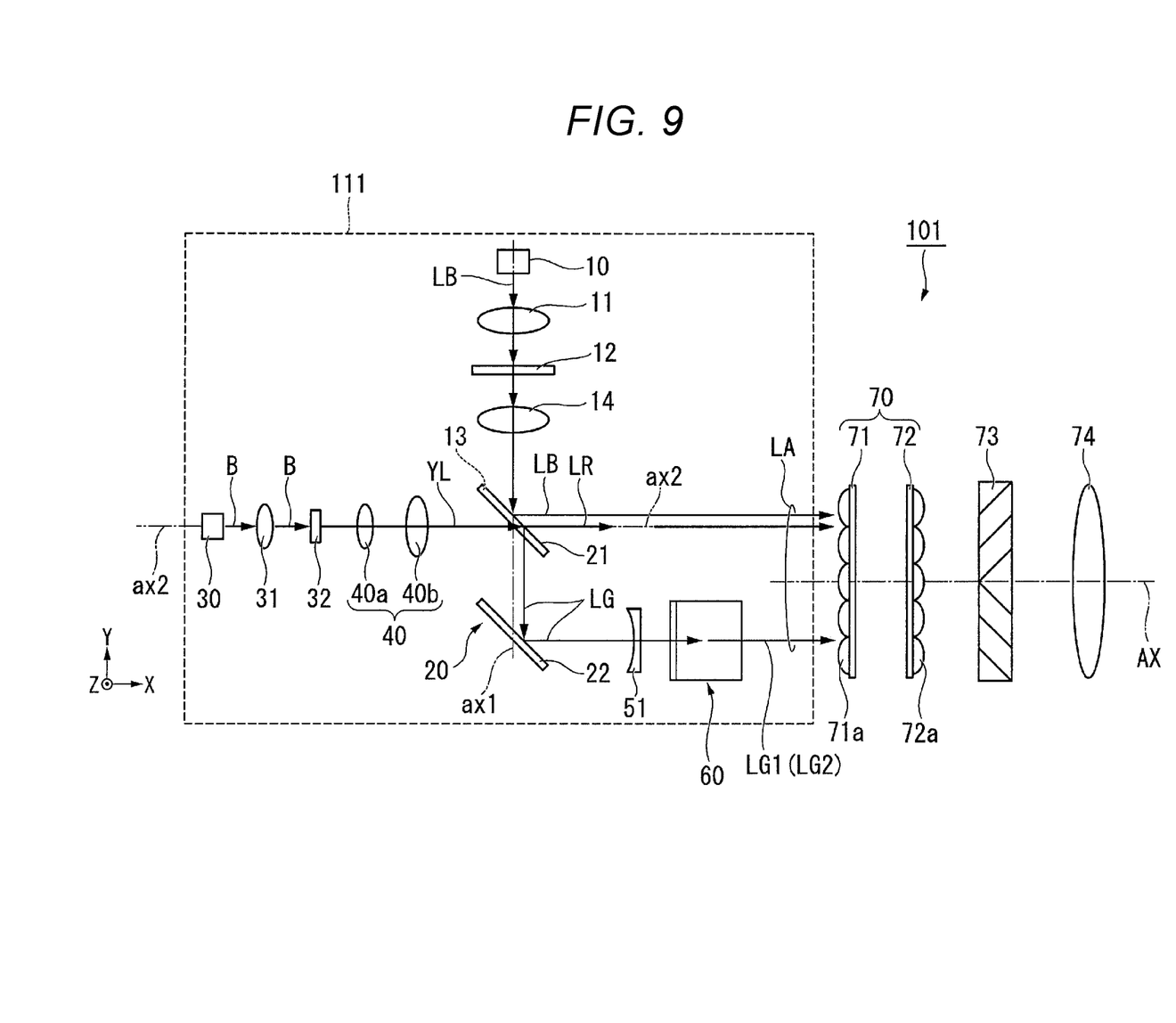
FIG. 9 is a top view of an illuminator in a second embodiment.

FIG. 9 is a top view of an illuminator in the present embodiment. In FIG. 9, an illuminator 101 is viewed from the side facing the positive side of the direction Z toward the negative side of the direction Z. The illuminator 101 in the present embodiment includes a light source unit 111, the lens integrator unit 70, the polarization converter 73, and the superimposing lens 74, as shown in FIG. 9.

The light source unit 111 in the present embodiment includes the light source 10, the first light collection lens 11, the diffuser 12, the mirror 13, the collimator lens 14, the excitation light source 30, the second light collection lens 31, the phosphor element 32, the collimator system 40, the light separator 20, a correction lens 51, and the light separating mirror group 60.

The surface of the phosphor element 32 is located at the point where the red light flux LR is brought into focus by the collimator system 40 in the present embodiment. That is, the red light flux LR out of the fluorescence YL exits from the focal position of the collimator system 40, whereby the collimator system 40 can satisfactorily parallelize the red light flux LR.

On the other hand, since the green light flux LG out of the fluorescence YL exits from a point shifted from the focal point of the collimator system 40, the collimator system 40 cannot satisfactorily parallelize the green light flux LG. Specifically, the point where the green light flux LG is brought into focus is shifted from the point where the red light flux LR is brought into focus toward the side nearer to the collimator system 40, that is, the side outward from the surface of the phosphor element 32. The green light flux LG having passed through the collimator system 40 therefore converges.

To avoid the problem, the illuminator 101 in the present embodiment is provided with the correction lens 51 in the optical path of the green light flux LG separated by the light separator 20. More specifically, the correction lens 51 is provided in a position on the optical path of the green light flux LG that is a position on the upstream of the light separating mirror group 60. Providing the correction lens 51 on the upstream of the light separating mirror group 60, that is, on the upstream of the point where the green light flux LG is divided into the two light fluxes as described above allows the one correction lens 51 to adjust the angle of divergence of the green light flux LG, whereby increases in the size and cost of the illuminator can be reduced.

Figure 10:
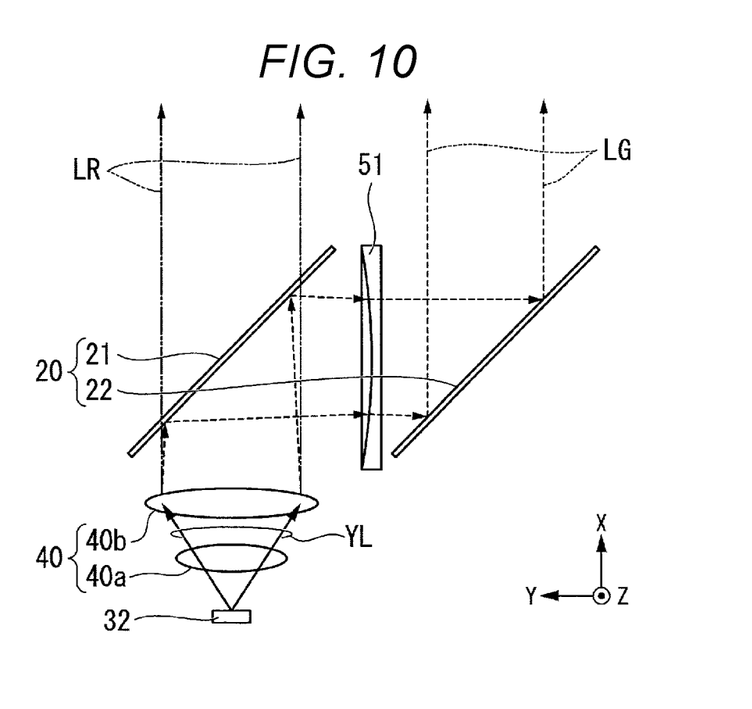
FIG. 10 describes the effect of a correction lens.

FIG. 10 describes the effect of the correction lens.

The correction lens 51 in the present embodiment is formed of a concave lens and causes the green light flux LG, which is a convergent light flux, to diverge and expand in such a way that the green light flux LG is parallelized. The green light flux LG that is not parallelized due to the chromatic aberrations can thus be satisfactorily parallelized.

A projector 1A according to the present embodiment, in which the angle of divergence of the green light flux LG is so adjusted by the correction lens 51 that the green light flux LG is parallelized, allows the green light flux LG to be incident on desired sub-pixels. Occurrence of the bleeding in the image light can therefore be suppressed, whereby the quality of the image light projected on the screen SCR can be improved.

Further, the projector 1A according to the present embodiment, in which the correction lens 51 causes the green light flux LG that is convergent in advance to diverge in such a way that the green light flux LG is parallelized, allows a decrease in width of the corrected light flux as compared with the configuration in the first embodiment, in which the correction lens 50 causes the red light flux LR that is divergent in advance to converge in such a way that the red light flux LR is parallelized. When the width of the light flux incident on the light modulator 200 decreases, the light flux is unlikely to be incident on an adjacent sub-pixel. The projector 1A according to the present embodiment therefore allows the bleeding in the image light to be more unlikely to occur as compared with the configuration in the first embodiment.

The present disclosure is not limited to the contents of the embodiments described above but can be changed as appropriate to the extent that the change does not depart from the substance of the present disclosure.

What is claimed is:

1. A projector comprising:
    a light source that outputs first light;
    an excitation light source that outputs excitation light;
    a wavelength converter that converts the excitation light outputted from the excitation light source into fluorescence;
    a collimator system that parallelizes the fluorescence outputted from the wavelength converter;
    a light separator that separates the fluorescence into second light and third light;
    a correction lens provided in an optical path of the second light or an optical path of the third light;
    a superimposing lens provided on a downstream of the correction lens;
    a light modulator having a plurality of pixels each including a first sub-pixel, a second sub-pixel, and a third sub-pixel;
    a microlens array provided at a light incident side of the light modulator and including a plurality of microlenses corresponding to the plurality of pixels; and
    a projection optical apparatus that projects light outputted from the light modulator,
    wherein the first light is incident on a first position on the superimposing lens,
    the second light is incident on a second position on the superimposing lens, and
    the third light is incident on a third position on the superimposing lens, wherein the first position, the second position, and the third position on the superimposing lens are different, the first light passes through the microlenses and is incident on the first sub-pixels, the second light passes through the microlenses and is incident on the second sub-pixels, and the third light passes through the microlenses and is incident on the third sub-pixels.

2. The projector according to claim 1, wherein the correction lens is a convex lens disposed in the optical path of the second light.

3. The projector according to claim 1, wherein the correction lens is a concave lens disposed in the optical path of the third light.

4. The projector according to claim 1, wherein the first light is blue light, the second light is red light, the third light is green light, and the projector further includes a light separating mirror that separates the third light into first green light and second green light.

5. The projector according to claim 4, wherein the pixels each further include a fourth sub-pixel, the first green light passes through the microlenses and is incident on the third sub-pixels, and the second green light passes through the microlenses and is incident on the fourth sub-pixels.

6. The projector according to claim 1, wherein the collimator system produces chromatic aberration.

7. The projector according to claim 1, wherein one of the second light and the third light exits from a point shifted from a focal point of the collimator system.

8. The projector according to claim 7, wherein the correction lens converges the one of the second light and the third light to be parallelized.

* * * * *